(12) United States Patent
Take

(10) Patent No.: US 7,797,002 B2
(45) Date of Patent: Sep. 14, 2010

(54) PAGING CONTROL METHOD, PAGING CONTROL APPARATUS, AND RADIO ACCESS NETWORK

(75) Inventor: Keijiro Take, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 427 days.

(21) Appl. No.: 10/562,676

(22) PCT Filed: Jul. 10, 2003

(86) PCT No.: PCT/JP03/08779

§ 371 (c)(1),
(2), (4) Date: Apr. 18, 2007

(87) PCT Pub. No.: WO2005/006800

PCT Pub. Date: Jan. 20, 2005

(65) Prior Publication Data

US 2007/0281715 A1  Dec. 6, 2007

(51) Int. Cl.
H04W 68/00 (2009.01)
H04W 4/00 (2009.01)
(52) U.S. Cl. .................................. 455/458; 455/435.1
(58) Field of Classification Search .................. 455/458
See application file for complete search history.

(56) References Cited

U.S. PATENT DOCUMENTS

| 4,827,499 A | 5/1989 | Warty et al. |
| 5,974,300 A | 10/1999 | LaPorta et al. |
| 6,292,667 B1 * | 9/2001 | Wallentin et al. ........... 455/458 |
| 6,529,484 B1 | 3/2003 | Quinquis et al. |
| 6,792,278 B1 * | 9/2004 | Ahmavaara et al. ......... 455/461 |

FOREIGN PATENT DOCUMENTS

| EP | 0 544 456 A2 | 6/1993 |
| GB | 2 350 918 A | 12/2000 |
| JP | 63-318894 A | 12/1988 |
| JP | 10-117386 A | 5/1998 |
| JP | 2000-115257 A | 4/2000 |
| JP | 2002-507869 A | 3/2002 |
| JP | 2002-527965 A | 8/2002 |
| WO | WO-99/48311 A2 | 9/1999 |
| WO | WO-00/21318 A1 | 4/2000 |
| WO | WO-02/41649 A2 | 5/2002 |
| WO | WO-02/063912 A1 | 8/2002 |

OTHER PUBLICATIONS

Shimizu, Keiichi et al., "Study on load Sharing of RNC" Institute of Electronics, Information and Communication Engineers, 2002, Figs. 1 & 2.

* cited by examiner

Primary Examiner—Lester Kincaid
Assistant Examiner—Yu (Andy) Gu
(74) Attorney, Agent, or Firm—Birch, Stewart, Kolasch and Birch, LLP

(57) ABSTRACT

In a radio access network in which a radio network controller is subjected to load distribution by a plurality of controllers, one of the controllers is set as a page controller that processes a paging message transmitted from a core network to the radio access network. When the paging control apparatus receives the paging message transmitted from the core network to the radio access network, the paging control apparatus judges a transmission destination of the paging message and transmits the paging message to the controllers that control a base station at the transmission destination.

19 Claims, 9 Drawing Sheets

PAGING CONTROL METHOD, PAGING CONTROL APPARATUS, AND RADIO ACCESS NETWORK

TECHNICAL FIELD

The present invention relates to a paging control method and a paging control apparatus for performing paging control in a mobile network communication system, and a radio access network including the paging control apparatus.

BACKGROUND ART

A first conventional technology for controlling paging from a plurality of inconsistent core networks to a radio access network is explained first (see, for example, Patent Document 1). FIG. 1 is a block diagram of a system configuration realized in the first conventional technology. In FIG. 1, a mobile communication terminal (MS) 101 is connected to one or more Base Stations (BSs) 102 through a radio network. The base stations 102 are connected to a Radio Network Controller (RNC) 103 of a Universal Terrestrial Radio Access Network (hereinafter, ""UTRAN"") 104. The radio network controller 103 is connected to a Mobile Switching Center (MSC) 105 in a core network A 110. The radio network controller 103 is capable of accessing a line switching network like a Public Switched Telephone Network (PSTN) or a packet switching network like the Internet 109 via the mobile switching center 105. The radio network controller 103 is also connected to a GPRS (General Packet Radio Service) Support Node (hereinafter, "SGSN") 106 of a Core Network B 111. The SGSN 106 is capable of accessing a packet switching network such as the Internet 109 via a Gateway GPRS Support Node (hereinafter, "GGSN") 107.

A paging control method in the first conventional technology, applicable to a mobile network to which two or more core networks not having consistency are connected, is explained next. When the radio network controller 103 receives a paging message from one core network (e.g., the core network A 110) to the mobile communication terminal 101, the radio network controller 103 inspects presence or absence of signal connection of the mobile communication terminal 101 and a service state of the mobile communication terminal 101. When signal connection with the other core network (e.g.; the core network B 111 in FIG. 1) is detected, the radio network controller 103 transmits the paging message to the base stations 102 using the signal connection already established.

The radio network controller 103 transmits the paging message only to the base station 102 for which signal connection with the mobile communication terminal 101 is established, rather than transmitting the paging message to all the base stations 102 connected to the radio network controller 103. In particular, when the signal connection is formed by an upstream random access channel and a call channel, the radio network controller 103 uses positional information of the mobile communication terminal 101 held by the radio network controller 103, and transmits the paging message only to a call channel of the base station 102 deduced from the positional information. Note that, when there is no signal connection between the mobile communication terminal 101 and the radio network controller 103, the radio network controller 103 executes usual paging on all the corresponding base stations 102.

A second conventional technology that discloses a method of realizing a load distribution system for a radio network controller in a mobile network communication system is explained next (see, for example, Non-patent Reference 1). FIG. 2 is a block diagram of a constitution of a load distributing radio network controller in the second conventional technology. In FIG. 2, a mobile communication terminal (MS) 101 is connected to one or more IP (Internet Protocol) connectable base stations (IP-BSs) 112 through a radio network. The base station 112 is connected, via an edge router 117 and based on the IP, to a Cell-corresponding Radio Bearer Server (hereinafter, "C-RBS") 113 that performs user plane radio access network control corresponding to a cell, a Station-corresponding Radio Bearer Server (hereinafter, "S-RBS") 114 that performs user plane radio access network control corresponding to a station, a Cell-corresponding Signaling Server (hereinafter, "C-SS") 115 that performs signal plane radio access network control corresponding to a cell, and a Station-corresponding Signaling Server (hereinafter, "S-SS") 116 that performs signal plane radio access network control corresponding to a station. The edge router 117, the C-RBS 113, the S-RBS 114, the C-SS 115, and the S-SS 116 perform radio access network control in association with one another. The servers 113 to 116 are connected to an IP-based core network 118 via the edge router 117.

The respective servers C-RBS 113, S-RBS 114, C-SS 115, and S-SS 116 are functionally distributed. In addition, it is possible to constitute each of the servers with a plurality of server groups. In other words, it is possible to further distribute a load in the servers 113 to 116 having one function. The C-RBS 113, the S-RBS 114, the C-SS 115, and the S-SS 116 are capable of operating as one radio network controller in association with one another.

In the network constitution shown in FIG. 2, when the core network 118 transmits a paging message to the mobile communication terminal 101, the core network 118 transmits the paging message to the S-SS 116. When the S-SS 116 is subjected to load distribution and constituted by a plurality of servers, the core network 118 transmits the identical paging message to all the servers constituting the S-SS 116.

Patent Document 1

Published Japanese Translation of a PCT Application No. 2002-527965 (pages 11 to 14)

Non-Patent Reference 1

Keiichi Shimizu, four others, "Study of RNC Load Distribution System", Papers from General Meeting of the Institute of Electronics, Information and Communication Engineers in 2002, the Institute of Electronics, Information and Communication Engineers, March 2002, p. 475

However, in the radio access network of the load distribution type described in the second conventional technology, it is necessary to transmit the paging message from the core network 118 to the servers 113 to 116. Thus, there is a problem in that there is an increase in paging traffic. In addition, a radio access network control function is distributed to the servers 113 to 116. Thus, to transmit the paging message received from the core network 118 to the base station 112, it is necessary to determine a server to which the paging message should be transmitted out of the other servers having the function, and transmit the paging message to the server determined. Therefore, there is also a problem in that traffic required for paging processing in the radio access network increases.

It is possible to apply a method, as described in the first conventional technology to the radio access network of the load distribution type of the second conventional technology, that is, determining a base station at a transmission destination of a paging message based on a connection state of the mobile communication terminal 101, that is, presence or absence of signal connection. However, in that case, inspection of presence or absence of signal connection and transmission processing for the paging message are not completed in one server, transmission and reception of control information among the servers 113 to 116, selection processing for a server, and transmission processing of the paging message among the servers 113 to 116 occur. Thus, there is a problem in that there is an increase in processing for paging and an increase in traffic in the radio access network.

An identifier of the mobile communication terminal 101 used for specifying signal connection is often temporarily allocated to the mobile communication terminal 101 by the radio access network. On the other hand, an identifier for specifying the mobile communication terminal 101 included in paging messages from the core networks 110, 111, and 118 is not the temporary identifier but an identifier allowing the core networks 110, 111, and 118 to specify the mobile communication terminal 101. The identifier may take several forms. Therefore, there is also a problem in that, to inspect presence or absence of signal connection every time a paging message is received, a correspondence relation among the temporary identifier allocated to the mobile communication terminal 101 in the radio access network, an identifier included in the paging message, and the signal connection has to be grasped.

The present invention is devised in view of the problems described above, and it is an object of the present invention to obtain a paging control method, a paging control apparatus, and a radio access network that are capable of controlling an increase in traffic of paging messages sent out from core networks in a radio access network of a load distribution type.

It is another object of the present invention to obtain a paging control method, a paging control apparatus, and a radio access network that are capable of controlling an increase in traffic among distributed servers required for paging processing in the radio access network of the load distribution type.

It is still another object of the present invention to obtain a paging control method, a paging control apparatus, and a radio access network that are capable of grasping a correspondence relation among a temporary identifier allocated to a mobile communication terminal in the radio access network, an identifier included in a paging message, and signal connection and inspecting presence or absence of the signal connection when the paging message is received.

DISCLOSURE OF INVENTION

To achieve the above objectives, the paging control method according to the present invention includes a core network; a radio access network including a plurality of base stations and a radio network controller serving as a paging control apparatus that includes two or more controllers that distribute communication between the core network and the base stations for each function and control the communication, one of the controllers processing a paging message transmitted from the core network to the radio access network; and a mobile communication terminal that performs communication with the base station via a radio interface, the paging control method including a first step of receiving the paging message transmitted from the core network to the radio access network; and a second step of judging a transmission destination of the paging message and transmitting the paging message to the controller that controls a base station at the transmission destination.

BEST MODE(S) FOR CARRYING OUT THE INVENTION

Exemplary embodiments of a paging control method, a paging control apparatus, and a radio access network according to the present invention are explained in detail below with reference to the accompanying drawings.

Figure 1:
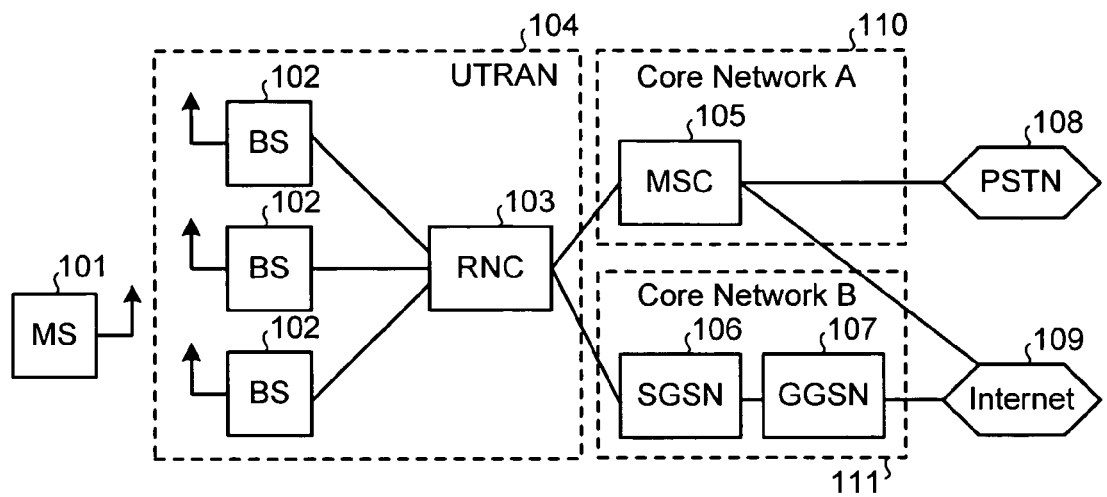
FIG. 1 is a block diagram of a system realized in a first conventional technology.
Figure 2:
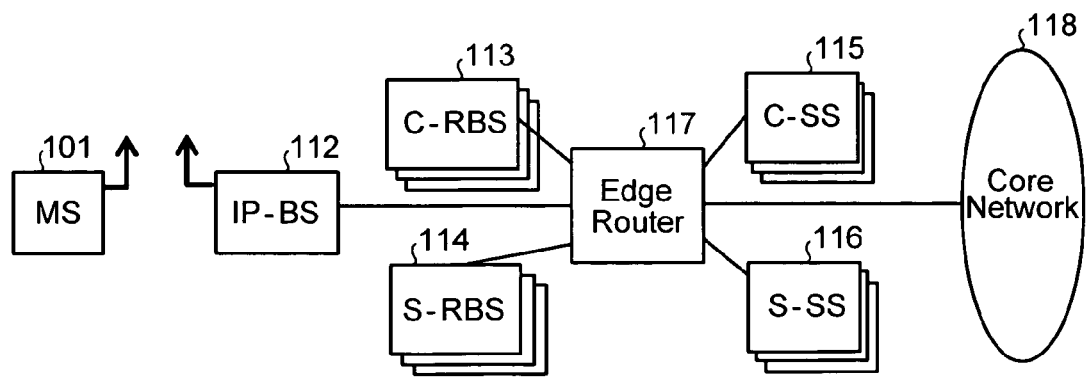
FIG. 2 is a block diagram of a load distributing radio network controller in a second conventional technology.
Figure 3:
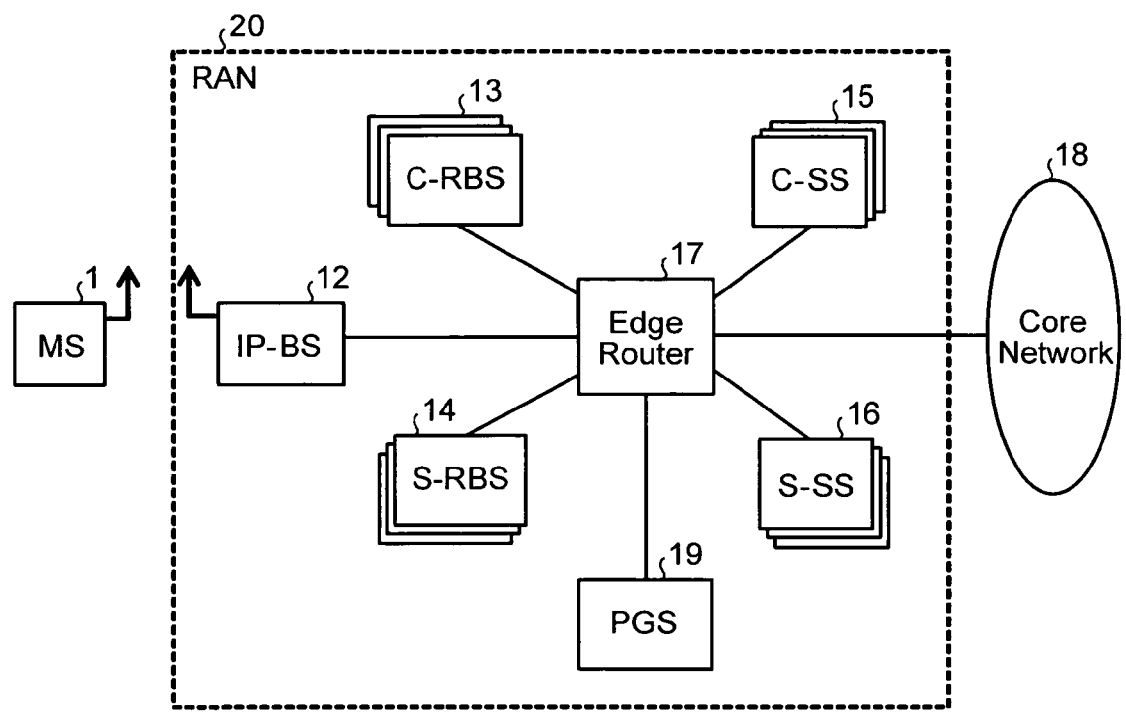
FIG. 3 is a schematic diagram of a mobile network system including a radio access network according to a first embodiment of the present invention.

FIG. 3 is a schematic diagram of a mobile network system including a radio access network according to a first embodiment of the present invention. In FIG. 3, the mobile network system includes a plurality of mobile communication terminals (MSs) 1, a Radio Access Network (RAN) 20, and a core network 18. The radio access network 20 includes a plurality of IP-based Base Stations (IP-BSs, hereinafter simply referred to as base stations) 12, an edge router 17, and a plurality of server groups. The base stations 12 and the server groups are connected via the edge router 17, and are also connected to the core network 18.

Control of the radio access network 20 is realized by a cooperative operation of a C-SS 15 that controls a base station constituting a call area of a mobile communication terminal not establishing signal connection, a C-RBS 13 that controls data transfer to all base stations controlled by the C-SS 15, an S-SS 16 that processes a signal between the base stations 12 and the mobile communication terminal 1 establishing signal connection, an S-RBS 14 that performs physical channel setting for signal connection between the mobile communication terminal 1 and the base stations 12 and control for transmission and reception of signal connection, and a Paging Control Server (PGS) 19 that performs paging control for transmitting a paging message received from the core network 18 to a predetermined mobile communication terminal 1.

Although the components in the radio access network 20 in FIG. 3 are connected based on the IP, it is also possible to use any other transmission form. However, in that case, a switching apparatus suitable for the transmission form is required instead of the edge router 17. The C-RBS 13, the S-RBS 14, the C-SS 15, the S-SS 16, and the paging control server 19 can adopt a constitution in which the respective servers are subjected to load distribution by a plurality of servers (apparatuses).

The C-RBS 13, the S-RBS 14, the C-SS 15, the S-SS 16, and the paging control server 19 operate as one large Radio Network Controller (RNC) in cooperation with one another with respect to the core network 18. When the server group operates as one radio network controller from the viewpoint of the core network 18, it is necessary to constitute the paging control server 19 to operate as a sole apparatus as a unit of the radio network controller. Consequently, the core network 18 transmits a paging message to the paging control server 19. However, when the paging control server 19 is subjected to load distribution, it is necessary to constitute the paging control server 19 such that one of the paging control servers 19 subjected to load distribution is treated as a sole paging control server 19 from the viewpoint of the core network 18.

Figure 4:
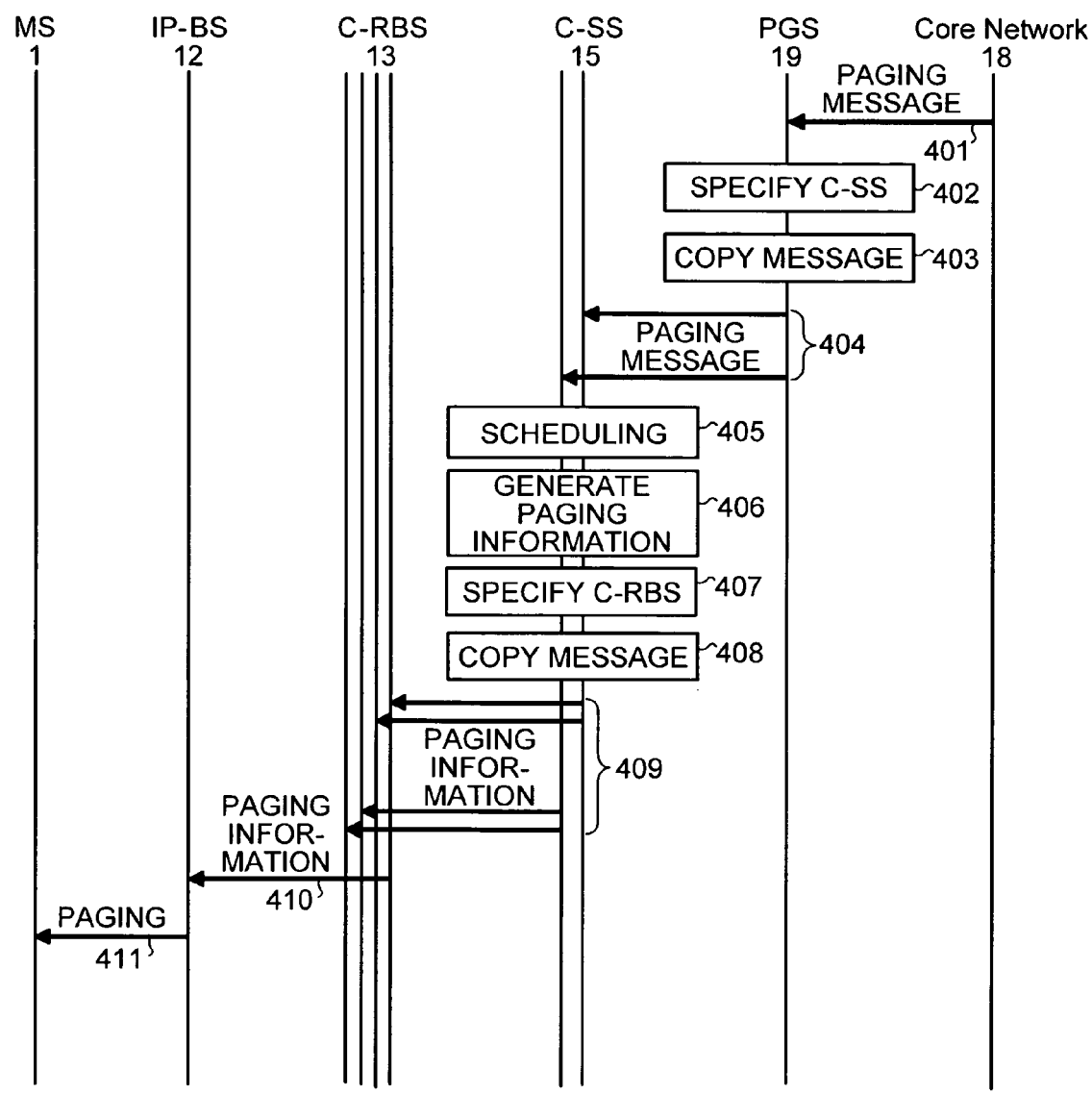
FIG. 4 is a sequence chart of operation processing for paging from a core network to a mobile communication terminal.

An operation for paging from the core network 18 to the mobile communication terminal 1, a position of which is grasped in the level of registration in the radio access network, is explained with reference to FIGS. 3 and 4. FIG. 4 is a sequence chart of operation processing for paging from a core network to a mobile communication terminal. Note that the edge router 17 is omitted in FIG. 4.

The core network 18 decides a call area from positional information of the mobile communication terminal 1, and transmits a paging message to a radio access controller constituting the call area (401). In this case, it is assumed that the mobile communication terminal 1 to which the core network 18 transmits the paging message is the mobile communication terminal 1, a position of which is registered in the radio access network 20 shown in FIG. 3. Therefore, the core network 18 transmits the paging message to the paging control server 19. The paging control server 19 receives the paging message transmitted from the core network 18 via the edge router 17.

The paging control server 19, which has received the paging message, specifies the C-SS 15 that controls the base station 12 constituting the call area (402), and transmits the paging message to the C-SS 15 specified (404). As a method with which the paging control server 19 recognizes the C-SS 15 that controls the base station 12 constituting the call area, there is a method of registering in advance an address of the C-SS 15 that controls the base station 12 constituting the call area. Another method is of setting a representative C-SS among a plurality of C-SSs 15, and when the paging control server 19 receives a paging message, specifying a destination C-SS 15 that controls the base station 12 constituting the call area by referring to the representative C-SS.

Note that, when the paging control server 19 transmits the paging message to the C-SS 15 that controls the base station 12 constituting the call area, if the C-SS 15 is subjected to load distribution by a plurality of servers, the paging control server 19 copies the paging message and transmits the paging message to all the C-SSs 15 that control the base station 12 constituting the call area (403).

The C-SS 15 that has received the paging message performs scheduling for information to be transmitted on a paging channel (405), and then creates paging information (406). The C-SS 15 specifies the C-RBS 13 that controls data transfer to the base station 12 controlled by the C-SS 15 (407), and transmits the paging information to the C-RBS 13 (409). In this case, when the C-RBS 13 to which the paging information is transmitted is subjected to load distribution by a plurality of servers, the C-SS 15 copies the paging information and transmits the paging information to all the C-RBSs 13 that control data transfer to the base station 12 controlled by the C-SS 15 (408). The C-RBS 13, which has received the paging information, transmits the paging information to the base station 12 (410). The base station 12 sends the paging information to a radio effective range of the base station 12 (411). The mobile communication terminal 1 present in a radio effective range of any one of the base stations 12 receives the paging information.

In the processing described above, the C-SS 15 performs the scheduling for information to be transmitted on a paging channel and the creation of paging information. However, it is also possible to adopt a form in which the C-RBS 13 carries out the scheduling for information to be transmitted on a paging channel and the creation of paging information. In this case, it is also possible to transmit a paging message directly from the paging control server to the C-RBS 13.

In the example explained above, the radio network controller includes the C-RBS 13, the S-RBS 14, the C-SS 15, the S-SS 16, and the paging control server 19. However, this does not mean that the present invention is limited to this example. For example, the function of the paging control server 19 may be implemented in one of the C-SSs 15 constituted by a plurality of servers, for example, the representative C-SS. It is also possible that the C-RBS 13 and the C-SS 15 are integrated into one server and the S-RBS 14 and the S-SS 16 are integrated into one server.

According to the first embodiment, the paging message from the core network 18 is transmitted to only the paging control server 19. The paging control server 19 transmits the paging message to the C-SS 15 or the C-RBS 13 that manages the base station 12 to which the paging message should be transmitted. Thus, it is possible to reduce paging traffic from the core network 18. It is also possible to reduce paging traffic in the radio access network 20, which increases when the function of the radio network controller in the radio access network 20 is distributed to a plurality of servers, and to reduce loads of paging processing by the respective servers.

In general, paging for a mobile communication terminal is performed by a network to establish connection to a base station to which the mobile communication terminal is connectable based on a response to a call to the mobile communication terminal. On the other hand, as described in the first conventional technology, when multi-call is realized, it may be impossible to recognize, on a core network side, presence or absence of connection between the mobile communication terminal and the network. In this case, because a paging message is transmitted from the core network, a radio access network detects signal connection between the network and the mobile communication terminal, and transmits the paging message through the signal connection detected. In a second embodiment, paging processing at the time when the signal connection between the network and the mobile communication terminal is present is explained.

Figure 5:
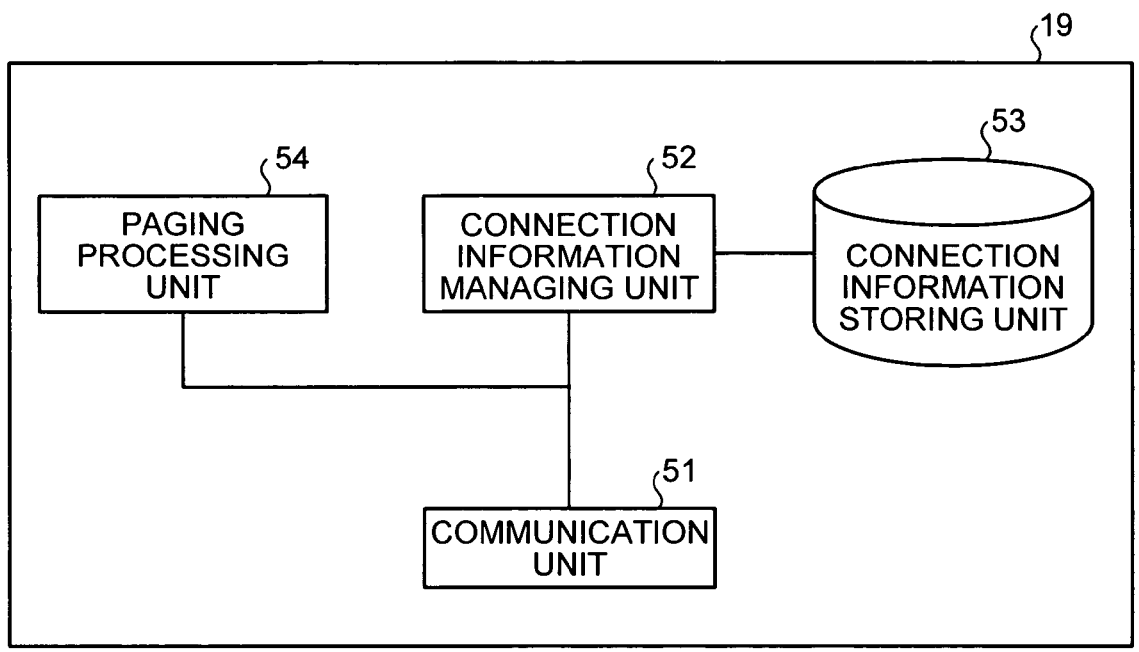
FIG. 5 is a block diagram of a paging control server according to a second embodiment of the present invention.

FIG. 5 is a block diagram of a paging control server according to a second embodiment of the present invention. The paging control server 19 includes a communicating unit 51, a connection information managing unit 52, a connection information storing unit 53, and a paging processing unit 54. The communicating unit 51 performs communication with the core network 18, the other severs in the radio access network 20, and the like.

When a registration request for signal connection information concerning first signal connection between the mobile communication terminal 1 and the radio access network 20 or second signal connection between the mobile communication terminal 1 and the core network 18 is received from a server in the radio access network 20, the connection information managing unit 52 stores the registration request in the connection information storing unit 53 (described later) and manages the registration request. When the first signal connection is set, the connection information managing unit 52 stores a first identifier for temporarily identifying the mobile communication terminal 1 and a server or a base station that controls the first connection in the connection information storing unit 53 as signal connection information together with the first signal connection. This is equivalent to first connection information in claims. When the second signal connection is set, the connection information managing unit 52 associates with the first identifier, a second identifier having a number form peculiar to the mobile communication terminal, and stores the second identifier in the connection information storing unit 53 as signal connection information. This is equivalent to second connection information in claims. When a third identifier of a number form different from the second identifier is notified to the mobile communication terminal 1 from the core network 18 when the second signal connection is set, the connection information managing unit 52 associates the third identifier with the first and the second identifiers, and stores the third identifier in the connection information storing unit 53 as signal connection information. This is equivalent to second connection information including the third identifier in claims.

The connection information storing unit 53 stores the signal connection information registered by the connection information managing unit 52.

The paging processing unit 54 transmits a paging message from the core network 18 to a predetermined mobile communication terminal 1 connected to the radio access network 20 via a radio interface. Specifically, when the paging message is a paging message to the mobile communication terminal having signal connection, the paging processing unit 54 specifies a server or a base station, which controls the mobile communication terminal 1, with reference to the signal connection information stored in the connection information storing unit 53, and transmits the paging message received to the server or the base station specified. When the paging message is a paging message to the mobile communication terminal 1 not having signal connection, as explained in the first embodiment, the paging processing unit 54 specifies a server (C-SS) that controls a base station constituting a call area in which the mobile communication terminal 1 is present, and transmits the paging message to the server.

By providing such a paging control server 19 in the radio access network 20, the paging message is transmitted among the plural servers with minimum traffic.

A paging control method is explained next. First, operations for establishment of signal connection between the mobile communication terminal 1 and the radio access network 20 and core network 18, and registration of the signal connection in the paging control server 19 are explained. Subsequently, paging processing at the time when signal connection between the radio access network 20 and core network 18 and the mobile communication terminal is present is explained.

Figure 6:
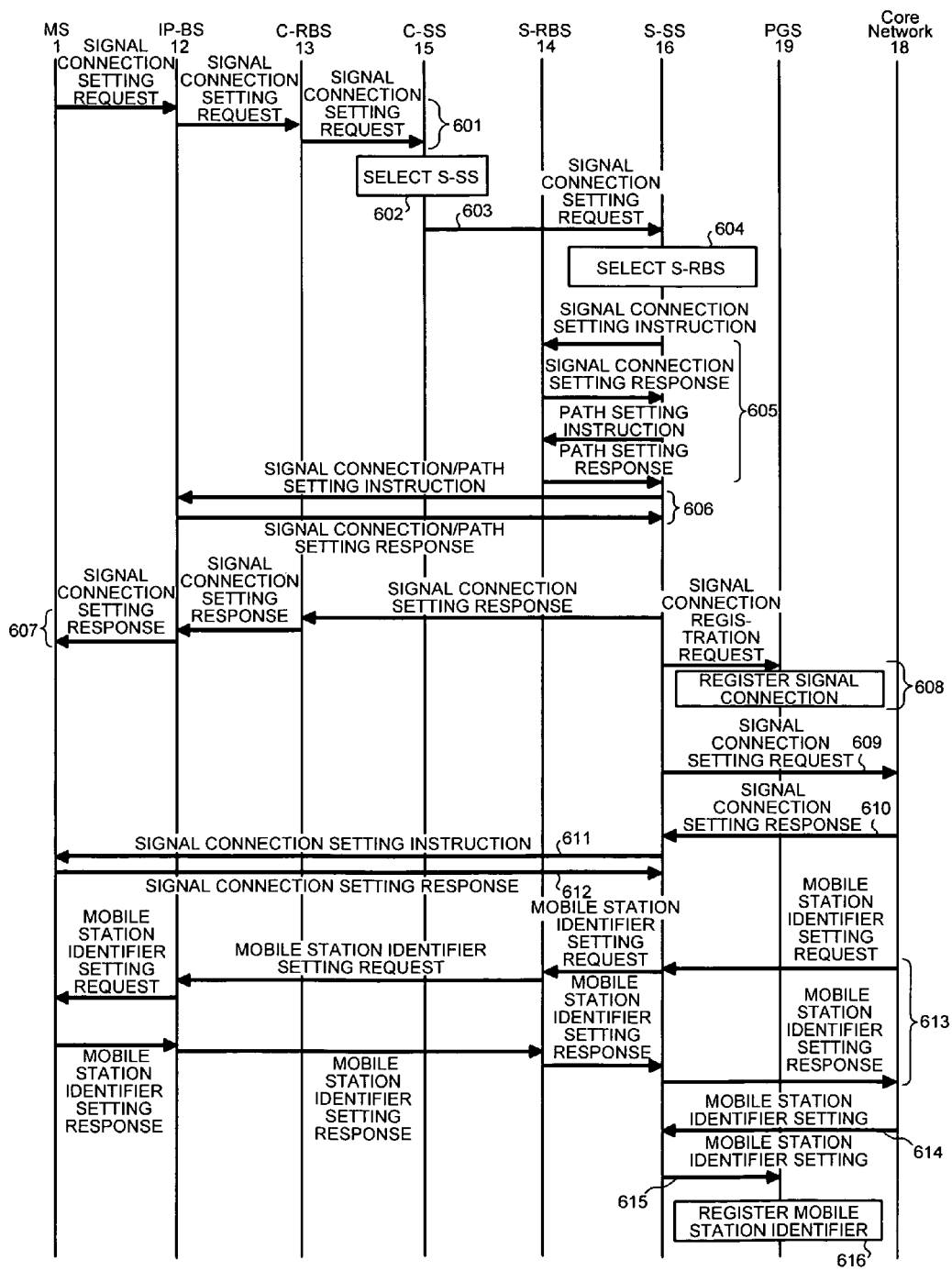
FIG. 6 is a sequence chart of operation processing for establishment of signal connection, performed by the mobile communication terminal.

FIG. 6 is a sequence chart of operation processing for establishment of signal connection, performed by the mobile communication terminal. Note that, to explain the processing with reference to FIG. 6, the mobile network having the constitution shown in FIG. 3 is explained as an example. The edge router is omitted in FIG. 6.

To start communication, the mobile communication terminal 1 performs processing for establishing signal connection between the mobile communication terminal 1 and the radio access network 20. First, the mobile communication terminal 1 transmits a signal connection establishment request signal to the base station 12. The base station 12 transmits a received signal to the C-RBS 13. The C-RBS 13 extracts the signal connection establishment request signal from the received signal and transmits the signal connection establishment request signal to the C-SS 15 (601). The C-SS 15 enters into an establishment operation for signal connection from the mobile communication terminal 1 in response to reception of the signal connection establishment request signal. In the establishment operation, the C-SS 15 selects the S-RBS 14 that manages physical channel setting for signal connection and transmission and reception of the signal connection between the mobile communication terminal 1 and the base station 12, and selects the S-SS 16 that processes a signal between the base station and the mobile communication terminal (602). The C-SS 15 transmits the received signal connection establishment request signal to the S-SS 16 selected (603).

When the signal connection establishment request signal is received, the S-SS 16 selects an S-RBS (604) and transmits an instruction for setting signal connection to the S-RBS 14, and an instruction for setting connection between the base station 12 and the S-RBS 14 and between the S-RBS 14 and the S-SS 16, to the base station 12 and the S-RBS 14 (605 to 606). When the setting for the instructions is complete, the S-SS 16 transmits a signal connection establishment response signal to the mobile communication terminal 1 (607). The S-SS 16 registers both a temporary identifier of the mobile communication terminal 1 and an identifier that can specify the mobile communication terminal 1, or only the temporary identifier of the mobile communication terminal 1 in the paging control server 19 in association with a signal connection identifier for identifying signal connection, S-SS identifiers for identifying the S-SS 16 and the S-RBS 14 serving as servers that control the signal connection, and an S-RBS identifier (608).

After the signal connection between the base station 12 and the mobile communication terminal 1 is established, the S-SS 16 enters into an establishment operation for signal connection between the mobile communication terminal 1 and the core network 18. First, the S-SS 16 transmits an establishment request message for signal connection between the mobile communication terminal 1 and the core network 18 to the core network 18 (609). After connection with the core network 18 is established (610), the S-SS 16 transmits a message for performing setting for connection between the mobile communication terminal 1 and the S-SS 16 to the mobile communication terminal 1 using the signal connection between the core network 18 and the mobile communication terminal 1 established as described above (611). When the S-SS 16 receives a response message from the mobile communication terminal 1 for the setting (612), establishment of signal connection between the mobile communication terminal 1 and the core network 18 is complete. Thereafter, the core network 18 notifies the mobile communication terminal 1 of an identifier for specifying the mobile communication terminal 1 using the signal connection (613), and then also notifies the S-SS 16 of the identifier (614). The S-SS 16 notifies the paging control server 19 of the identifier for specifying the mobile communication terminal 1 and the signal connection notified (615). The paging control server 19 stores these pieces of information in association with information on the signal connection (616).

Figure 7:
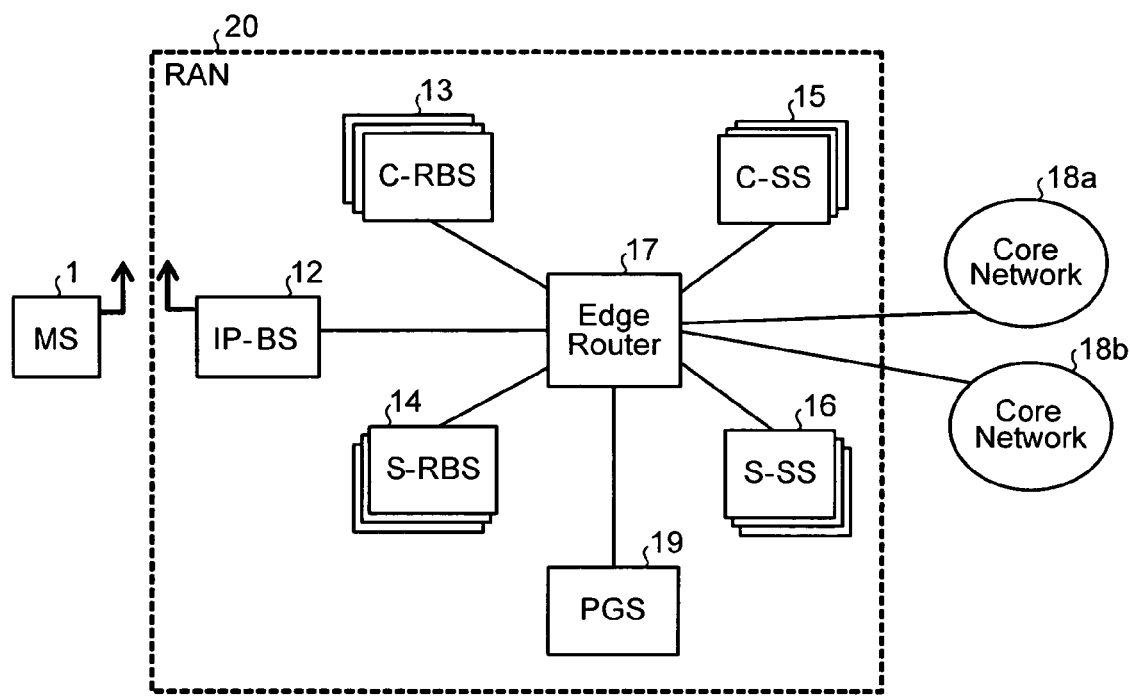
FIG. 7 is an example of a constitution of a mobile network in the second embodiment.

Paging processing at the time when multi-call is sent from the inconsistent two core networks 18 to the mobile communication terminal 1 is explained with reference to FIGS. 7 and 8. FIG. 7 is an example of a constitution of a mobile network in the second embodiment. The mobile network has a constitution in which two inconsistent core networks 18a and 18b are connected to the radio access network 20. Note that, a constitution of the radio access network 20 is the same as that shown in FIG. 3 in the first embodiment, and an explanation of the constitution is omitted.

Figure 8:
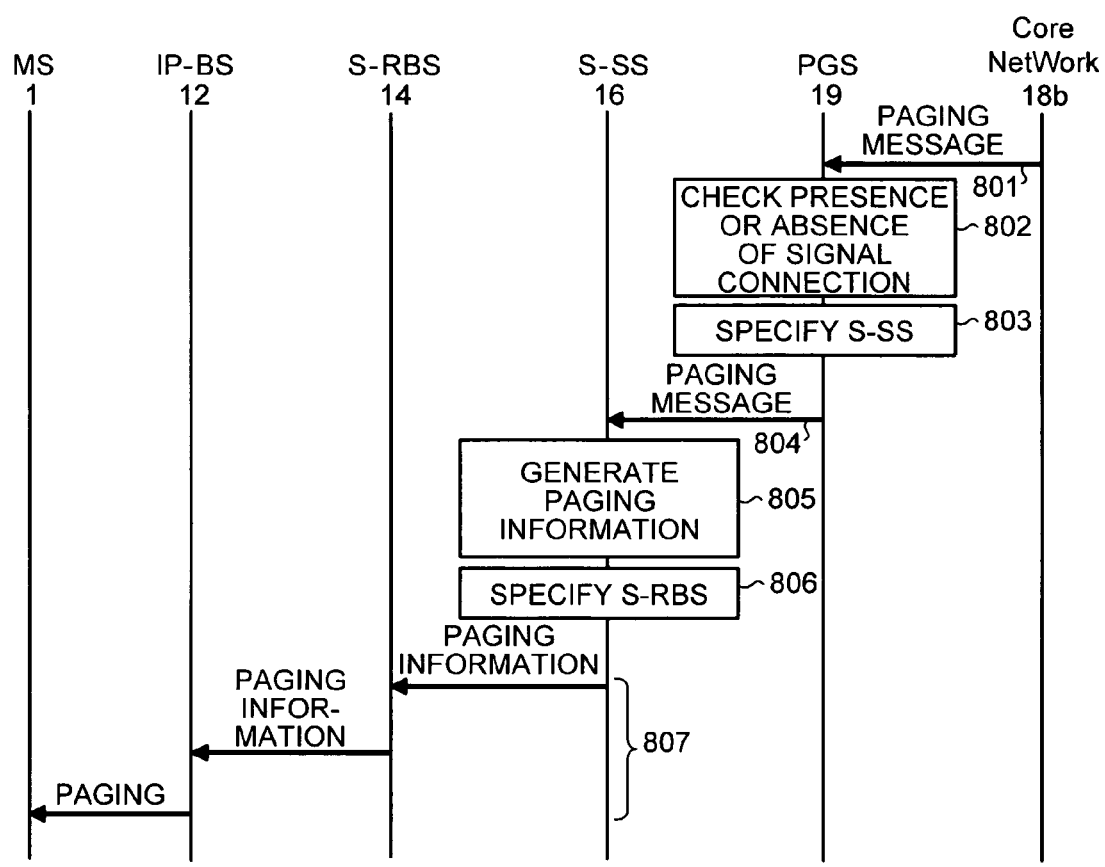
FIG. 8 is a sequence chart of operation processing for multi-call paging.

FIG. 8 is a sequence chart of operation processing of multi-call paging. In an example shown in FIG. 8, the mobile communication terminal 1 is in a state in which signal connection between the mobile communication terminal 1 and the core network 18a is established according to the method as in FIG. 6, but there is no signal connection between the mobile communication terminal 1 and the core network 18b. Multi-call paging is issued from the core network 18b to the mobile communication terminal 1.

As described in the first embodiment, the paging control server 19 receives a paging message transmitted from the core network 18b (801). The paging control server 19 judges whether the mobile communication terminal 1 has signal connection with the radio access network 20 or with the core network 18 using signal connection information stored in the paging control server 19 and based on an identification number of the mobile communication terminal 1 in the received paging message (802).

If there is no signal connection between the mobile communication terminal 1 and the radio access network 20 or the core networks 18, the paging control server 19 calls the mobile communication terminal 1 according to the method described in the first embodiment. Because the call is not multi-call, the call is an operation that cannot be taken in the second embodiment. On the other hand, if the paging control server 19 detects presence of the signal connection between the mobile communication terminal 1 and the radio access network 20 or the core networks 18, the paging control server 19 specifies the S-SS 16 that terminates the signal connection between the mobile communication terminal 1 and the radio access network 20 or the core network 18 based on the signal connection information registered concerning the mobile communication terminal 1, as shown in FIG. 6 (803). Note that, in this example, it is detected that the signal connection between the mobile communication terminal 1 and the core network 18a is established.

The paging control server 19 transmits the paging message from the core network 18b to the S-SS 16 specified (804). The S-SS 16, which has received the paging message, creates paging information (805) and specifies the S-RBS 14 that controls signal connection (806). The S-SS 16 transmits the paging message to the mobile communication terminal 1 via the S-RBS 14 specified and the base station 12 using the first or the second signal connection between the radio access network 20 or the core network 18 and the mobile communication terminal 1 (807).

According to the second embodiment, in the distributed radio access network, when signal connection is established between the mobile communication terminal 1 and the core network 18 or the radio access network 20, signal connection information associating the signal connection, a server that controls the signal connection, and the mobile communication terminal 1 is stored in the paging control server 19 that processes a paging message transmitted from the core network. Thus, even when a paging message is received from another core network 18 that does not establish signal connection, it is possible to transmit a paging message to the mobile communication terminal 1 corresponding to the core network 18 using the signal connection. This makes it possible to perform transmission processing for a paging message even in case of multi-call paging. When the core networks 18a and 18b connected to the radio access network 20 affix terminal identifiers of independent number systems to the mobile communication terminal 1, respectively, it is also possible to perform transmission processing for a paging message efficiently. As in the first embodiment, to determine a server to which a paging message should be transmitted, it is possible to control transmission processing for a paging message exchanged among distributed servers and control an increase in traffic.

Figure 9:
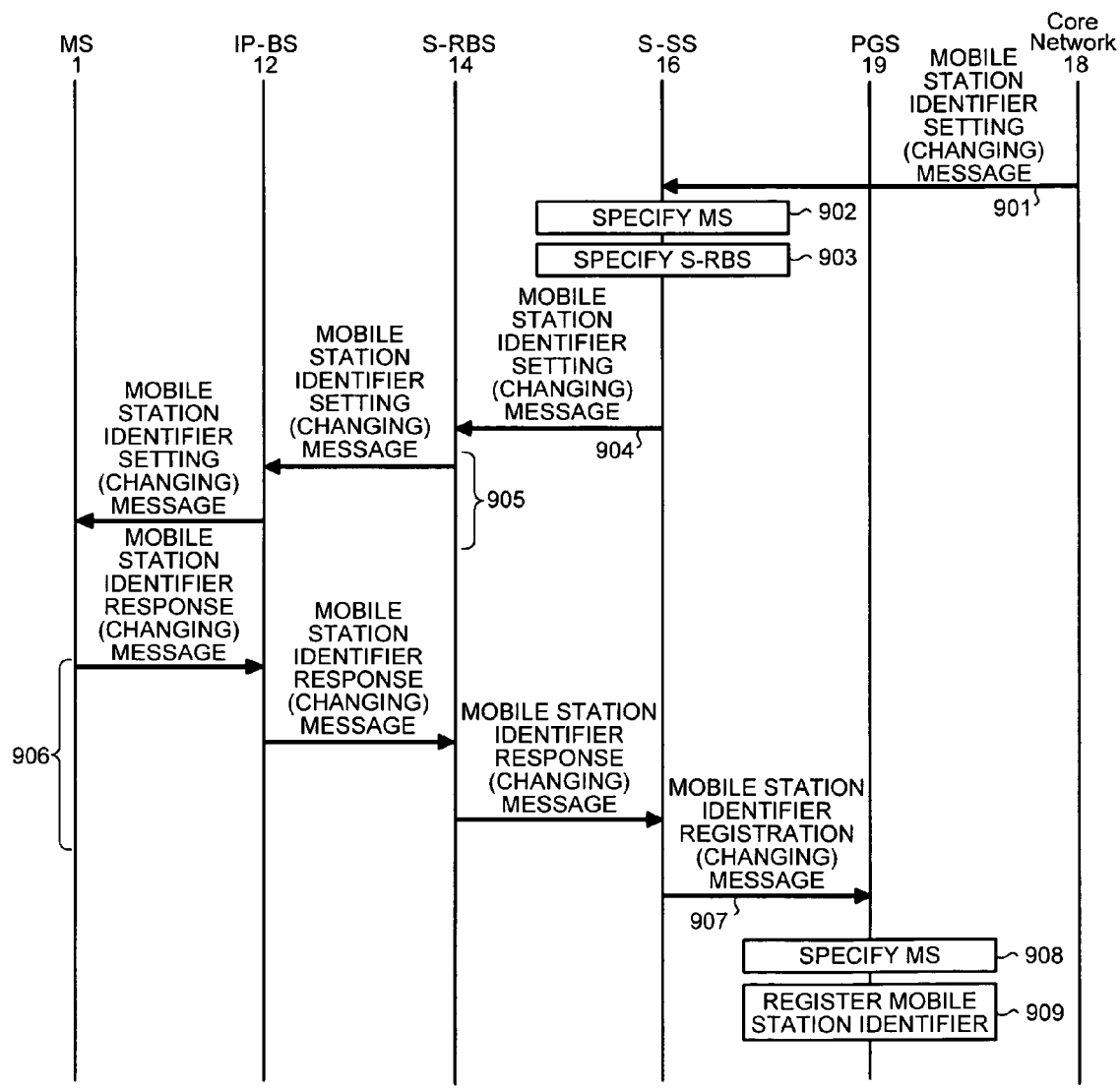
FIG. 9 is a sequence chart of an operation procedure by which a core network registers in a paging control server, a new mobile communication terminal identifier for specifying a mobile communication terminal.

FIG. 9 is a sequence chart of an operation procedure by which a core network registers in a paging control server, a new mobile communication terminal identifier for specifying a mobile communication terminal. Note that the edge router is omitted in FIG. 9. In the following explanation, a registration operation for a mobile communication terminal identifier for a mobile network having the constitution in FIG. 3 or 7 is explained as an example.

When the core network 18 changes a mobile communication terminal identifier for the mobile communication terminal 1, first, the core network 18 notifies the S-SS 16 of a mobile communication terminal identifier newly set for the mobile communication terminal 1 (901). The S-SS 16 specifies the mobile communication terminal 1 from a number of a signal channel through which a message for setting (changing) the mobile communication terminal identifier is received (902). The core network 18 specifies the S-RBS 14 that manages physical channel setting for signal connection and transmission and reception of the signal connection between the mobile communication terminal 1 and the base station 12 (903). Thereafter, the S-SS 16 notifies the S-RBS 14 specified of the mobile communication terminal identifier designated by the core network 18 (904). The S-RBS 14 notifies the mobile communication terminal 1 of the mobile communication terminal identifier via the base station 12 (905). The mobile communication terminal 1 performs setting for notification of the mobile communication terminal identifier, and then transmits a notification response to the S-SS 16 (906).

The S-SS 16, which has received the communication response for the new mobile communication terminal identifier from the mobile communication terminal 1, registers the mobile communication terminal identifier in the paging control server 19 (907). The paging control server 19 specifies the mobile communication terminal 1 for which the mobile communication terminal identifier is registered (908), and sets or updates signal connection information for the mobile communication terminal 1 in the connection information storing unit (909). In this case, the paging control server 19 registers the new mobile communication terminal identifier with a number form of the mobile communication terminal identifier, a temporary identifier allocated to the mobile communication terminal 1 by the radio access network 20, an identifier for identifying signal connection, and an identifier for identifying the S-SS 16 as keys. If a mobile communication terminal identifier of the mobile communication terminal 1 is already registered in the paging control server 19 from the core network 18, the paging control server 19 updates the mobile communication terminal identifier to the mobile communication terminal identifier set anew including the number form thereof. In the case of the mobile network having the constitution shown in FIG. 7, that is, when the inconsistent core networks 18a and 18b are connected to the radio access network 20, a mobile communication terminal identifier is registered in the paging control server 19 with respect to the core networks 18 as one unit.

Note that the same operation processing as that explained in the second embodiment is performed for establishment of signal connection between the mobile communication terminal 1 and the radio access network 20, and a paging operation using signal connection correspondence to the mobile communication terminal 1 registered for the paging control server 19. Thus, an explanation of the operation processing is omitted here.

According to the third embodiment, the core network 18 is capable of using, for paging, a mobile communication terminal identifier different from an identifier that is set when a mobile communication terminal first establishes signal connection. Consequently, the radio access network 20 can cope with a plurality of mobile communication terminal identifiers that are used at the time of paging.

Figure 10:
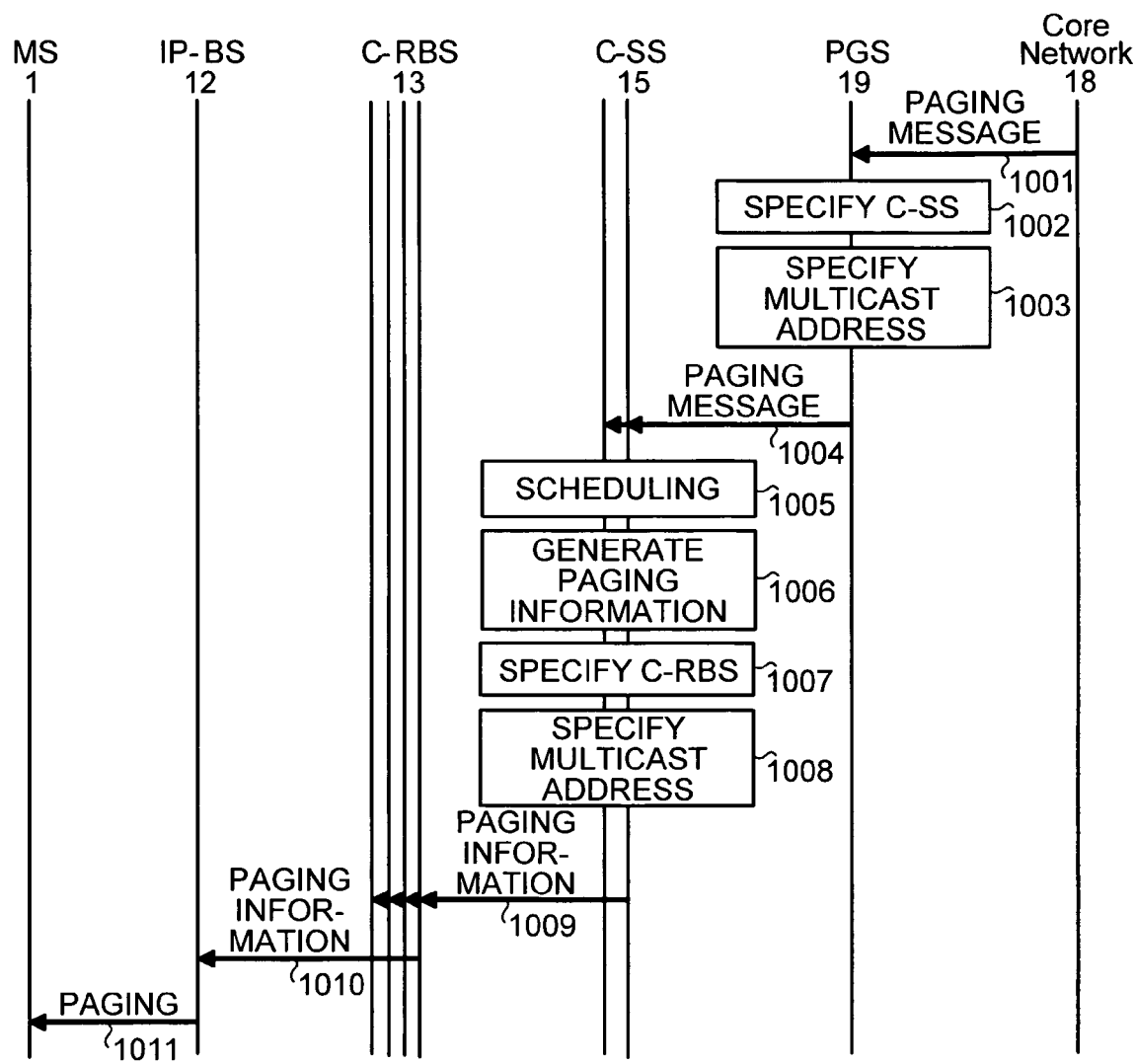
FIG. 10 is a sequence chart of processing for paging from the core network to the mobile communication terminal, according to a fourth embodiment.

In the fourth embodiment, a processing method different from that in the first embodiment is explained with reference to FIGS. 3 and 10. This processing method is for paging from the core network 18 to the mobile communication terminal 1, a position of which is grasped in the level of registration in the radio access network. FIG. 10 is a sequence chart of the fourth embodiment of processing for paging from a core network to a mobile communication terminal. However, the edge router 17 is omitted in FIG. 10.

As in the processing 401 to 402 in FIG. 4 in the first embodiment, when the paging control server 19 receives a paging message from the core network 18 to the mobile communication terminal 1, the paging control server 19 specifies the C-SSs 15 that control the base station 12 constituting a call area (1001 to 1002). Subsequently, the paging control server 19 specifies a predetermined multicast address out of multicast addresses registered in advance such that addresses of all the C-SSs 15 specified are included (1003). The paging control server 19 transmits a paging message to all the specified C-SSs 15 using the multicast address (1004). As a method of forming the multicast addresses registered in the paging control server 19 in advance, there is a method of forming multicast addresses corresponding to call areas in a one-to-one relation, and another method of forming one call area with several multicast addresses. The latter method is used, for example, when the base station 12 is included in a plurality of multicast addresses.

The C-SS 15, which has received the paging message, performs scheduling for information to be transmitted on a paging channel (1005), and then creates paging information (1006). The C-SS 15 specifies all the C-RBSs 13 that control data transfer to the base station 12 controlled by the C-SS 15 (1007). The C-SS 15 specifies a predetermined multicast address out of the multicast addresses registered in advance such that addresses of all the C-RBSs 13 specified are included (1008). The C-SS 15 transmits the paging message to all the specified C-RBSs 13 using the multicast address (1009).

The C-RBS 13, which has received the paging information, also transmits the paging information to all the base stations 12 corresponding thereto using the multicast addresses registered in advance (1010). The paging information is transmitted to the mobile communication terminal 1 via the base station 12 (1011).

In the above explanation, the C-SS 15 performs the scheduling for information to be transmitted on a paging channel and the creation of paging information. However, the C-RBS 13 may carry out the processing. In this case, paging information may be directly transmitted from the paging control server 19 to the C-RBS 13. It is also possible to implement the function of the paging control server 19 in one of the C-SSs 15, for example, the representative C-SS.

According to the fourth embodiment, it is possible to realize a reduction in copy processing in respective distributed servers. In addition, it is possible to reduce processing for a paging message as the distributed radio access network 20 as a whole by setting multicast addresses in the respective servers in advance.

As explained above, according to the present invention, a radio network controller that controls a radio access network includes a plurality of controllers distributed for each predetermined function, and one of the controllers is set as a paging control apparatus that performs processing for a paging message transmitted by a core network. Thus, it is possible to reduce loads due to paging processing in the respective controllers in the radio access network, reduce paging traffic involved in the paging processing in the radio access network, and reduce a quantity of paging messages from the core network.

When the mobile communication terminal establishes signal connection with the radio access network or the core network, the paging control apparatus stores the signal connection, a controller that controls the signal connection, a temporary identifier for identifying the mobile communication terminal, and an identifier allocated to the mobile communication terminal by the core network in association with one another. Thus, even when plural core networks affix identifiers to mobile communication terminals individually, it is possible to cope with the identifiers.

INDUSTRIAL APPLICABILITY

As described above, the present invention is suitable for a mobile network communication system that applies paging control to a mobile communication terminal via a radio interface.

The invention claimed is:

1. A paging control method executed by a radio network controller in a mobile network including a core network, a radio access network, and a mobile communication terminal, wherein the radio access network includes a plurality of base stations, and the radio network controller, the radio network controller including at least two controllers, one of the at least two controllers being a first controller processing a paging message transmitted from the core network to the radio access network, and wherein the mobile communication terminal performs communication with at least one of the base stations via a radio interface, the paging control method comprising:

receiving at the first controller in the radio network controller the paging message transmitted from the core network to the radio access network;

judging at the first controller a transmission destination of the paging message by:

determining whether an active signal connection currently exists between the mobile communication terminal and the radio access network or the core network, said active signal connection comprising a dedicated channel between the mobile communication terminal and the radio access network or the core network for signal communications, said determining being executed by referring to signal connection information registered within the first controller using an identifier assigned to the mobile communication terminal by the radio access network, when the active signal connection is determined to currently exist, judging the transmission destination to be one of the at least two controllers in the radio network controller that controls the signal connection, and when the active signal connection is not determined to currently exist, judging the transmission destination to be one of the at least two controllers that controls a predetermined base station of the base stations or one of the base stations that is identified from the paging message; and transmitting from the first controller the paging message to the transmission destination, wherein a function of the radio network controller of controlling communications between the core network and the base stations is distributed among the at least two controllers in the radio network controller.

2. The paging control method according to claim 1, wherein the paging message is transmitted by multicast transmission.

3. A radio network controller in a mobile network that includes a core network, a radio access network, and a mobile communication terminal configured to perform communication with a base station via a radio interface, wherein the radio access network includes a plurality of base stations and the radio network controller, the radio network controller comprising:

at least two controllers among which controlling of communication between the core network and the base stations is functionally distributed, one of the at least two controllers being a first controller configured to:

receive a paging message transmitted from the core network to the radio access network, judge a transmission destination of the paging message by:

determining whether an active signal connection currently exists between the mobile communication terminal and the radio access network or the core network, said active signal connection comprising a dedicated channel between the mobile communication terminal and the radio access network or the core network for signal communications, said determining being executed by referring to signal connection information registered within the first controller using an identifier assigned to the mobile communication terminal by the radio access network;

when the active signal connection is determined to currently exist, judging the transmission destination to be one of the at least two controllers that controls the signal connection; and when the active signal connection is not determined to currently exist, judging the transmission destination to be one of the at least two controllers that controls a predetermined base station of the base stations or one of the base stations that is identified from the paging message; and transmit the paging message to the transmission destination.

4. The radio network controller according to claim 3, further comprising:

a connection information registering unit configured to register signal connection information including a first indication of whether a first active connection between the mobile communication terminal and the radio access network currently exists, a second indication of whether a second active connection between the mobile communication terminal and the core network currently exists, and a specified controller configured to control the first active connection or the second active connection, wherein the first controller refers to the signal connection information to judge the transmission destination to the specified controller.

5. The radio network controller according to claim 4, wherein the signal connection information includes first connection information including the first active connection, a first identifier that temporarily identifies the mobile communication terminal, and the specified controller configured to control the first active connection, and second connection information that associates the first identifier with a second identifier having a number form peculiar to the mobile communication terminal, if the mobile communication terminal sets the second active connection, and upon receiving a paging message including the second identifier from the core network, the first controller refers to the signal connection information to judge the transmission destination.

6. The radio network controller according to claim 5, wherein the second connection information further includes a third identifier having a number form peculiar to the core network and associated with the first identifier and the second identifier, when the core network notifies the mobile communication terminal of the third identifier, and upon receiving a paging message including the third identifier from the core network, the first controller refers to the signal connection information to judge the transmission destination.

7. The radio network controller according to claim 4, wherein when the transmission destination is judged to include multiple controllers or base stations, the first controller copies the paging message, and transmits the copied paging message to all the multiple controllers or base stations.

8. The radio network controller according to claim 4, wherein the paging message is transmitted by multicast transmission.

9. The radio network controller according to claim 4, wherein the one of the at least two controllers judged as the transmission destination includes a second controller that controls a base station within a call area of the mobile communication terminal decided by the core network, and a third controller that controls data transfer to the base station controlled by the second controller, and upon receiving the paging message from the core network, the first controller transmits the paging message to the second controller or the third controller using a multicast address of the second controller or the third controller associated with the call area, the multicast address having been registered in advance.

10. A radio access network comprising:

a plurality of base stations configured to perform communication with a mobile communication terminal via a radio interface; and a radio network controller that is connected to a core network and that includes at least two controllers among which controlling of communication between the core network and the base stations is functionally distributed, wherein the at least two controllers includes a first controller configured to receive a paging message transmitted from the core network to the radio access network, judge a transmission destination of the paging message by:

determining whether an active signal connection currently exists between the mobile communication terminal and the radio access network or the core network, said active signal connection comprising a dedicated channel between the mobile communication terminal and the radio access network or the core network for signal communications, said determining being executed by referring to signal connection information registered within the first controller using an identifier assigned to the mobile communication terminal by the radio access network;

when the active signal connection is determined to currently exist, judging the transmission destination to be one of the at least two controllers that controls the signal connection; and when the active signal connection is not determined to currently exist, judging the transmission destination to be one of the at least two controllers that controls a predetermined base station of the base stations or one of the base stations that is identified from the paging message, and transmit the paging message to the transmission destination.

11. The radio access network according to claim 10, wherein the first controller further includes a connection information registering unit configured to register signal connection information including a first indication of whether a first active connection between the mobile communication terminal and the radio access network currently exists, a second indication of whether a second active connection between the mobile communication terminal and the core network currently exists, and a specified controller configured to control the first active connection or the second active connection, and the first controller refers to the signal connection information to judge the transmission destination to be the specified controller.

12. The radio access network according to claim 11, wherein the signal connection information includes first connection information including the first active connection, a first identifier that temporarily identifies the mobile communication terminal, and the specified controller configured to control the first active connection, and second connection information that associates the first identifier with a second identifier having a number form peculiar to the mobile communication terminal, if the mobile communication terminal sets the second active connection, and upon receiving a paging message including the second identifier from the core network, the first controller refers to the signal connection information to judge the transmission destination.

13. The radio access network according to claim 12, wherein the second connection information further includes a third identifier having a number form peculiar to the core network and associated with the first identifier and the second identifier, when the core network notifies the mobile communication terminal of the third identifier, and upon receiving a paging message including the third identifier from the core network, the first controller refers to judge the transmission destination.

14. The radio access network according to claim 11, wherein the one of the at least two controllers judged to be the transmission destination includes multiple controllers, and the first controller copies the paging message, and transmits the copied paging message to all the multiple controllers or all base stations controlled by the multiple controllers.

15. The radio access network according to claim 11, wherein the paging message is transmitted by multicast transmission.

16. The radio access network according to claim 11, wherein the one of the at least two controllers judged as the transmission destination includes a second controller that controls a base station within a call area of the mobile communication terminal decided by the core network, and a third controller that controls data transfer to the base station controlled by the second controller, and upon receiving the paging message from the core network, the first controller transmits the paging message to the second controller or the third controller using a multicast address of the second controller or the third controller associated with the call area, the multicast address having been registered in advance.

17. The radio access network according to claim 16, wherein the multicast address of the third controller associated with the second controller is registered in advance, and upon receiving the paging message from the first controller, the second controller transmits the paging message to the third controller using the multicast address.

18. The radio access network according to claim 17, wherein a multicast address including all base stations controlled by the third controller is registered in advance, and upon receiving the paging message from the second controller, the third controller transmits the paging message to all the base stations controlled by the third controller using the multicast address.

19. The radio access network according to claim 16, wherein a multicast address including all base stations controlled by the third controller is registered in advance, and upon receiving the paging message from the second controller, the third controller transmits the paging message to all the base stations controlled by the third controller using the multicast address.

* * * * *